(12) United States Patent
Abdel-Kader (10) Patent No.: US 7,844,269 B2
(45) Date of Patent: Nov. 30, 2010

(54) SCANNING CELL-DEPENDENT GROUPS OF PROFILES OF WIRELESS LOCAL AREA NETWORKS

(75) Inventor: Sherif Abdel-Kader, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 828 days.

(21) Appl. No.: 11/625,419

(22) Filed: Jan. 22, 2007

(65) Prior Publication Data

US 2008/0176579 A1    Jul. 24, 2008

(51) Int. Cl.
 H04W 4/00    (2009.01)
 H04W 40/00    (2009.01)
 H04B 7/00    (2006.01)

(52) U.S. Cl. .................. 455/435.2; 455/432.1; 455/448; 455/41.2; 370/338

(58) Field of Classification Search .............. 455/432.3, 455/435.1, 435.2, 435.3, 432.1, 443, 444, 455/448, 41.2, 574; 370/328, 338
See application file for complete search history.

(56) References Cited

U.S. PATENT DOCUMENTS

| | | | |
|---|---|---|---|
| 6,393,006 B1 | 5/2002 | Kajihara | |
| 6,850,774 B1 | 2/2005 | Cashman | |
| 7,561,545 B2 * | 7/2009 | Abdel-Kader | ............... 370/328 |
| 2003/0118015 A1 | 6/2003 | Gunnarsson et al. | |
| 2004/0120278 A1 | 6/2004 | Krantz et al. | |
| 2004/0165563 A1 | 8/2004 | Hsu et al. | |
| 2005/0122921 A1 | 6/2005 | Seo | |
| 2005/0245269 A1 | 11/2005 | Demirhan et al. | |
| 2005/0281234 A1 | 12/2005 | Kawamura et al. | |
| 2006/0133330 A1 | 6/2006 | Chin | |
| 2006/0142004 A1 * | 6/2006 | He et al. | ...................... 455/434 |
| 2006/0148487 A1 | 7/2006 | Kim et al. | |
| 2006/0280128 A1 | 12/2006 | Abdel-Kader | |
| 2007/0277047 A1 | 11/2007 | Mehta et al. | |

FOREIGN PATENT DOCUMENTS

| | | |
|---|---|---|
| EP | 1526682 | 4/2005 |
| GB | 2420937 | 6/2006 |
| WO | 99/65270 | 12/1999 |
| WO | 2004031488 | 4/2004 |
| WO | 2004045225 | 5/2004 |
| WO | 2007082368 | 7/2007 |

OTHER PUBLICATIONS

Nguyen, Tuan H., Final Office Action for US 11/147,291 Dec. 16, 2008.

(Continued)

*Primary Examiner*—Un C Cho
(74) *Attorney, Agent, or Firm*—Integral Intellectual Property Inc.; Miriam Paton (57) ABSTRACT

A wireless device capable of wireless local area network (WLAN) communications and cellular network communications stores profiles of wireless local area networks. The device identifies in which cell of a cellular network the device is currently located, and then scans more frequently for wireless local area networks matching profiles to which, previously, the device has connected while located in the cell, than for wireless local area networks matching other profiles.

15 Claims, 9 Drawing Sheets

OTHER PUBLICATIONS

Lombardi, Giuseppe, Extended European Search Report for EP 07100949.2, Jul. 17, 2007.

Matar, G., First Office Action for CA 2546330, Sep. 24, 2008.

Nguyen, Tuan H., First Office Action for U.S. Appl. No. 11/147,291, May 7, 2007.

Nguyen, Tuan H., Final office Action for U.S. Appl. No. 11/147,291, Oct. 23, 2007.

Nguyen, Tuan H., Advisory Action for U.S. Appl. No. 11/147,291, Feb. 8, 2008.

Nguyen, Tuan H., Second Office Action for U.S. Appl. No. 11/147,291, May 16, 2008.

Rosenauer, H, Extended European Search Report for 05104968.2, Nov. 11, 2005.

Scott, Anne-Marie, First Office Action for CA 2,622,304, Mar. 4, 2010.

Nguyen, Tuan Hoang, Second Advisory Action for U.S. Appl. No. 11/147,291, Feb. 19, 2009.

Abdel-Kader, Sherif et al., "Location-Based Pattern for Scanning for Wireless Local Area Networks", Feb. 21, 2007.

* cited by examiner

SCANNING CELL-DEPENDENT GROUPS OF PROFILES OF WIRELESS LOCAL AREA NETWORKS

BACKGROUND

A wireless local area network (WLAN) client device may store in its memory one or more profiles of wireless local area networks. A profile may include, for example, the service set identity (SSID) of the network, WLAN configuration parameters, security credentials, and Internet Protocol (IP) network parameters. The SSID is also known as the network name. The profiles may be assigned priorities, for example, by a user that has purchased the client device, a carrier who controls the sale of the client device, or an administrator of an enterprise that has purchased the client device.

Scanning is the process of identifying existing networks. A client device having two or more profiles may scan for WLANs matching the profiles in sequence, and if no successful connection is achieved then the client device may go into a sleep state for a sleep interval (e.g., a few seconds) before trying to scan the profiles again. This may be applicable only to profiles of WLANs having suppressed SSIDs.

While a device is not in coverage and is scanning for WLANs, the average amount of charge drawn from its battery may be related to the ratio between the time spent in the sleep state and the time spent scanning. For a device with N profiles, an exemplary sequence for scanning/sleeping may be as follows: $P_1 P_2 \ldots P_N \text{Sleep}_1 P_1 P_2 \ldots P_N \text{Sleep}_2 P_1 P_2 \ldots P_N \text{Sleep}_3 P_1 P_2 \ldots P_N \text{Sleep}_4 P_1 P_2 \ldots P_N$ where $\text{Sleep}_1, \text{Sleep}_2, \ldots$ are sleep intervals between profile scanning intervals, and the duration of sleep intervals may be increased (that is, $\text{Sleep}_1 < \text{Sleep}_2 < \text{Sleep}_3 < \ldots$) until it reaches an upper limit. The more profiles the device is scanning for, the lower the ratio between the time spent in the sleep state and the time spent scanning. This may have an adverse effect on the battery life of the device.

BRIEF DESCRIPTION OF THE DRAWINGS

Embodiments are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

A WLAN client device may also be able to communicate with base stations of a wireless wide area network (WWAN), for example, a cellular communications network. While in cellular mode, the client device still needs to scan for WLAN networks. This is to explore whether roving to WLAN mode is possible. When the client device scans for WLAN connectivity, it cycles through the WLAN profiles, one by one, scanning for network presence and possibly connecting if one is found. During scanning the WLAN radio of the client device consumes a lot of power.

The client device prioritizes the WLAN profiles according to the current location in the cellular network. Once the client device has identified in which cell of the cellular network it is located, the client device scans more frequently for wireless local area networks matching profiles to which, previously, the device has connected while located in the cell, than for wireless local area networks matching other profiles.

For example, the client device may scan once per each sleep interval for wireless local area networks matching profiles to which, previously, the device has connected while located in the cell, and may scan once per each other sleep interval for wireless local area networks matching the other profiles.

The client device may maintain cell records, each cell record identifying the cell and comprising one or more cell-specific profile records. A profile record identifies a profile and notes the number of times the device has connected to a WLAN matching the identified profile while located in the cell.

The client device may partition the profiles into two or more cell-specific groups based on whether a profile record is maintained for the cell and the number of times the device was located in the cell and connected to a WLAN matching the profile identified in the profile record. Each group may have associated therewith a fixed number of sleep intervals, or a set of sleep interval durations.

Figure 1:
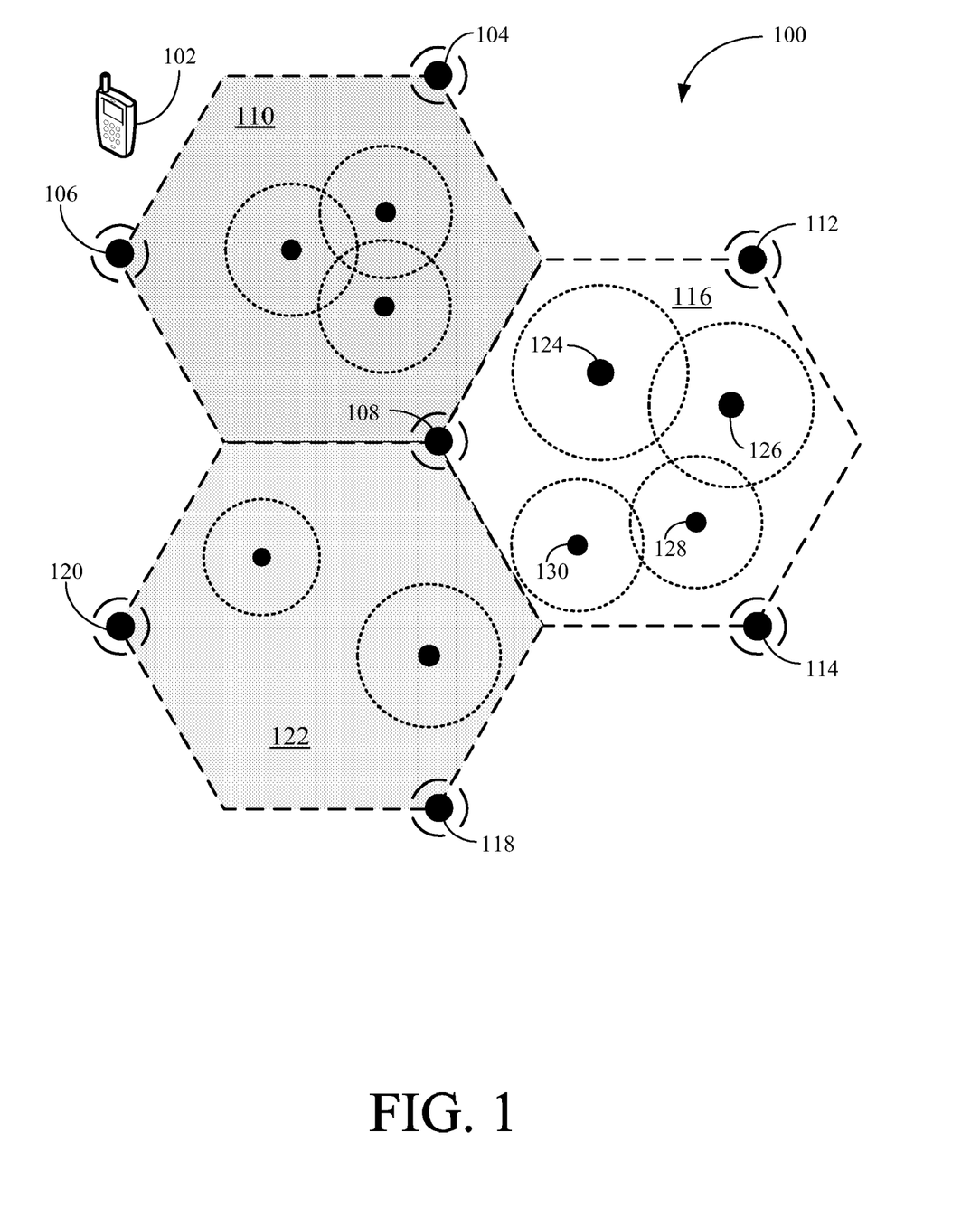
FIG. 1 is an illustration of an exemplary communications environment.

Reference is made to FIG. 1, which is an illustration of an exemplary communications environment 100 in which a client device 102 is found.

Environment 100 comprises cellular base stations and WLAN access points (AP). Base stations 104, 106 and 108 create a cell 110. Base stations 112, 114 and 108 create a cell 116, and base stations 118, 120 and 108 create a cell 122. Although presented in FIG. 1 as hexagons, cells may have any physical shape. While located in any of cells 110, 116 and 122, device 102 is able to communicate with one or more of the base stations. The base stations transmit identification signals that may identify the cells.

APs 124, 126, 128 and 130 are located in cell 116. Similarly, APs are located in cells 110 and 122. Although coverage areas of the APs are presented in FIG. 1 as circles, coverage areas may have any physical shape. Device 102 may detect an AP while located in its coverage area and may associate itself with a detected AP.

A user of device 102 may carry device 102 to different places at different times. Device 102 may store in its memory profiles of WLANs. A profile may include, for example, the service set identity (SSID) of the network, WLAN configuration parameters, security credentials, and Internet Protocol (IP) network parameters.

Device 102 may maintain cell records for different cells, each cell record containing profile records of the number of times the device has connected to wireless local area networks matching profiles stored in the device while located in the cell. An exemplary implementation of cell records and profile records will now be described. Device 102 may maintain a list of cells it roams to. Each item in the list is a record as follows:

```
CellInfo RECORD {
CellID
WLANAssocInfo[MAX_PROFILES]
}
``` where CellID is the code identifying the cell the device just roamed to, WLANAssocInfo [ ] is a linked list of the record WLANAssocInfo which contains info about the profiles the device has associated with. The record WLANAssocInfo is as follows:

```
WLANAssocInfo RECORD {
ProfileID
NumAssociations
}
```

Figure 2:
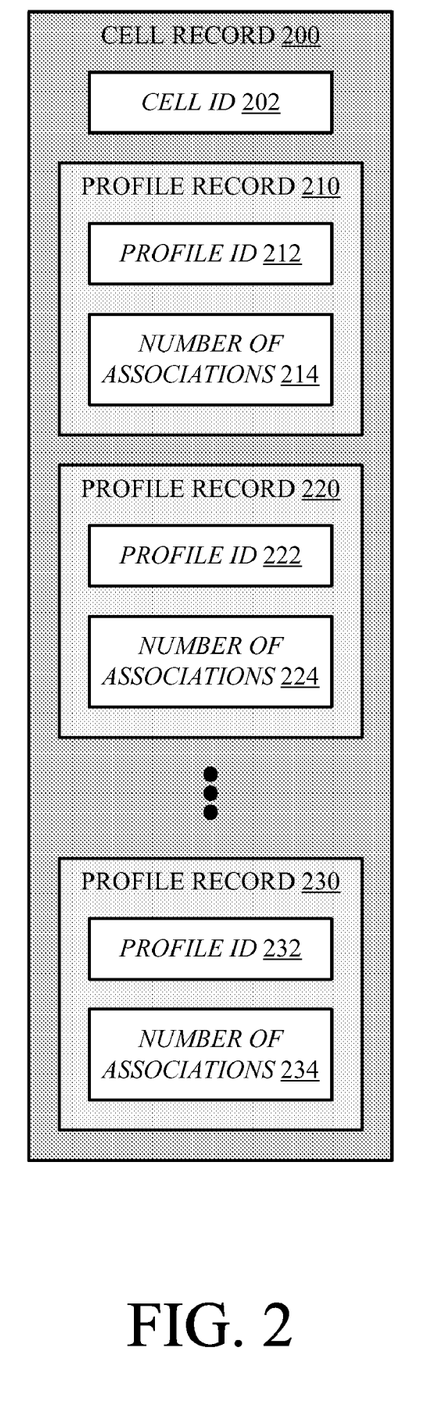
FIG. 2 is an illustration of the structure of an exemplary cell record containing exemplary profile records.

Reference is made to FIG. 2, which is an illustration of the structure of an exemplary cell record containing exemplary profile records. Cell record 200 is for cell ID 202 and has profile records 210, 220 and 230. Profile records 210, 220 and 230 are for profile IDs 212, 222 and 232, respectively. The number of associations 214 is a count of the number of times the device was connected to the profile having profile ID 212 while the device was located in the cell having cell ID 202. Likewise, the number associations 224 is a count of the number of times the device was connected to the profile having the profile ID 222 while the device was located in the cell having cell ID 202.

Figure 3:
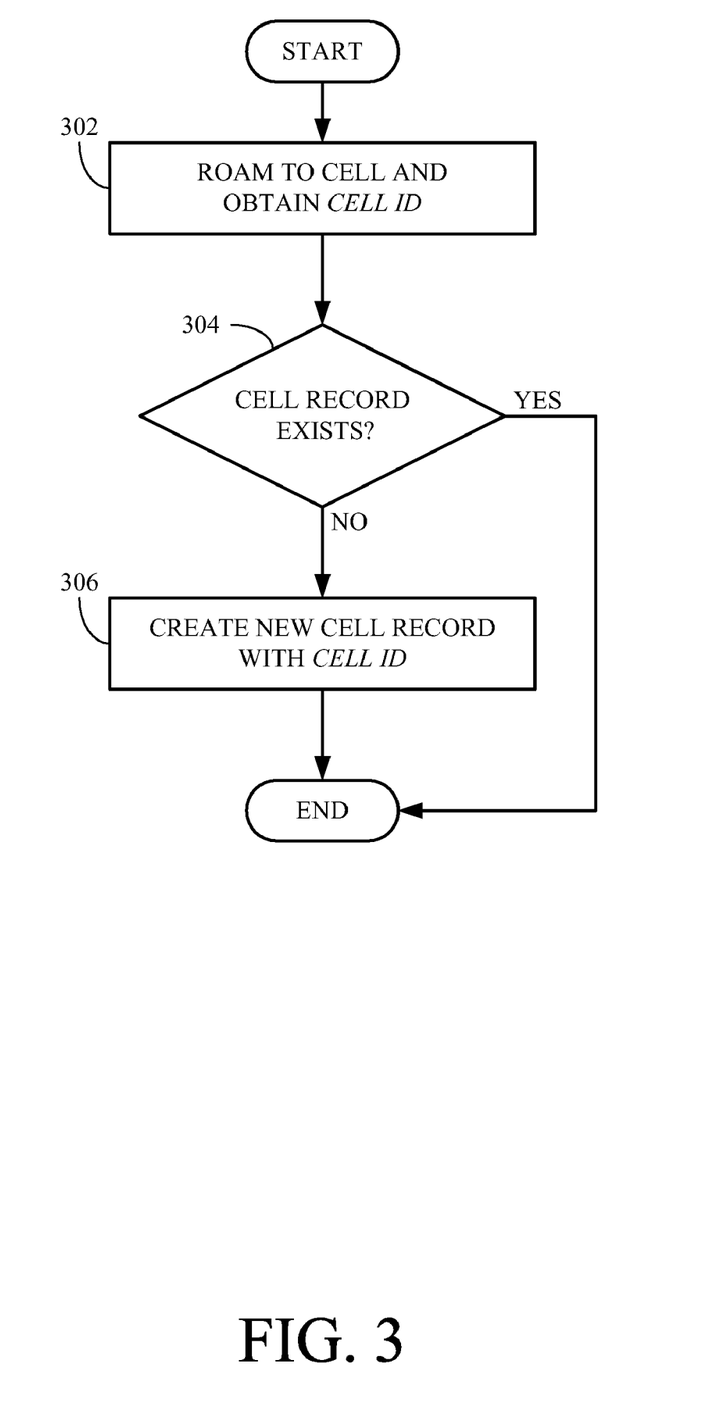
FIG. 3 is a flowchart of an exemplary method for creating cell records.
Figure 4:
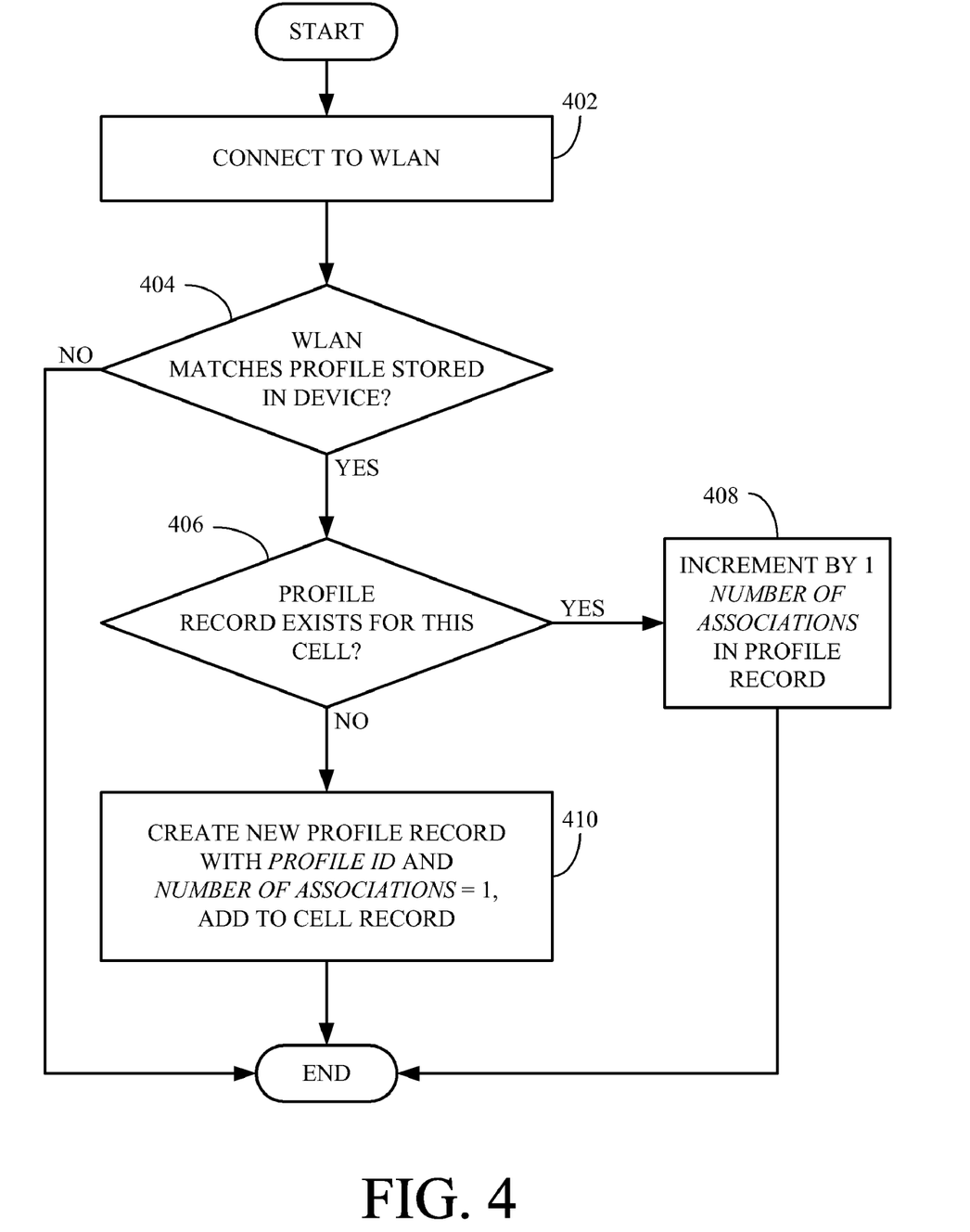
FIG. 4 is a flowchart of an exemplary method for updating cell records.

Reference is also made to FIGS. 3 and 4, which are flowcharts of methods for maintaining cell records. As device 102 is carried by its user, it roams in and out of cells, scans for WLANs and connects to WLANs.

FIG. 3 is a flowchart of an exemplary method for creating cell records. At 302, device 102 roams to a particular cell and obtains the cell ID of the particular cell. For example, device 102 may have roamed into cell 116, and cell ID, identifying cell 116, may be obtained from signals transmitted by base station 108, 112 or 114. If device 102 already has a cell record for this cell ID, as checked at 304, then the method ends. Otherwise, at 306, a new cell record for this cell ID is created, and the method ends.

FIG. 4 is a flowchart of an exemplary method for updating cell records. At 402, device 102 connects to a WLAN while located in a particular cell. If the WLAN does not match any profile stored in device 102, as checked at 404, the method ends. Otherwise, it is checked at 406 whether a profile record for this profile exists in the cell record of this particular cell. If so, then at 408, the number of associations field in the profile record is incremented by 1, and the method ends. If no profile record for this profile exists in the cell record of this particular cell, then at 410, a new profile record is created with the profile ID of the profile matching the WLAN, and the number of associations field set to 1. This profile record is added to the cell record of this particular cell.

Returning briefly to FIG. 1, while located in cell 116, device 102 may be able to connect to APs 124, 126, 128 and 130 if located within their respective coverage areas. Consider, for example, that device 102 stores profiles $P_1$, $P_2$, $P_3$, $P_4$, and $P_5$. Consider also that device 102 maintains a cell record for cell 116, and that while located in cell 116, device 102 has connected to a WLAN matching profile $P_1$ on 8 occasions, to a WLAN matching profile $P_3$ on 2 occasions, and to a WLAN matching profile $P_4$ on 1 occasion. The cell record for cell 116 will therefore contain three profile records—one for profile $P_1$, with number of associations equal to 8; one for profile $P_3$, with number of associations equal to 2; and one for profile $P_4$, with number of associations equal to 1.

Figure 5:
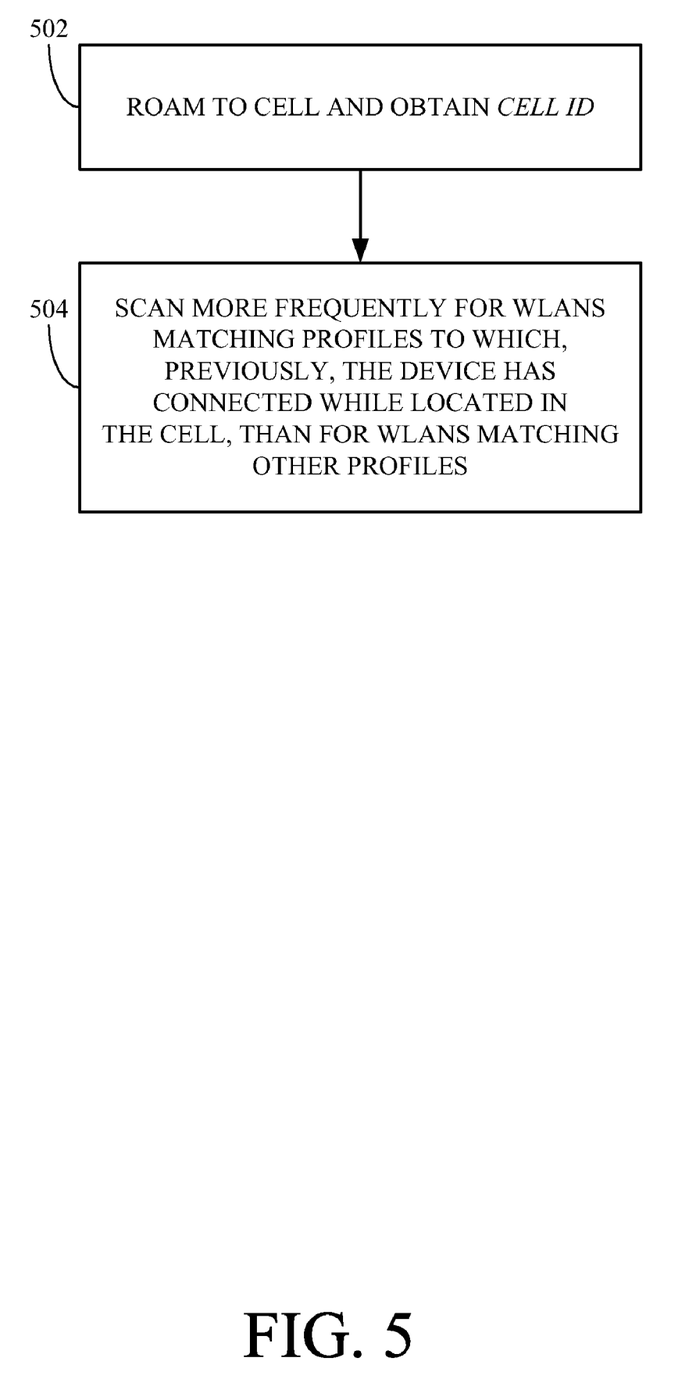
FIG. 5 is a flowchart of an exemplary scanning method.

FIG. 5 is a flowchart of an exemplary scanning method. At 502, the device roams to a cell and obtains a cell ID. At 504, the device scans for WLANs, scanning more frequently for WLANs matching profiles to which, previously, the device has connected while located in the cell, than for WLANs matching other profiles.

For example, the profiles stored in the device may be partitioned into two groups: (1) profiles to which, previously, the device has connected while located in the cell; and (2) other profiles. The partition of the profiles into groups will depend on which cell the device is located in when performing the scanning. The device may scan once per each sleep interval for wireless local area networks matching profiles in the first group and once per each other sleep interval for wireless local area networks matching profiles in the second group.

To continue the example for the cell record for cell 116 given above, device 102 may scan for WLANs matching the profiles $P_1$, $P_3$ and $P_4$ after each sleep interval and device 102 may scan for WLANs matching the profiles $P_2$ and $P_5$ after every other sleep interval:

$P_1P_2P_3P_4P_5$ Sleep$_1$ $P_1P_3P_4$ Sleep$_2$ $P_1P_2P_3P_4P_5$ Sleep$_3$ $P_1P_3P_4$ Sleep$_4$ . . . .

For the group of profiles $P_1$, $P_3$ and $P_4$, the set of sleep interval durations is Sleep$_1$, Sleep$_2$, Sleep$_3$, Sleep$_4$, etc. For the group of profiles $P_2$ and $P_5$, the set of sleep interval durations is Sleep$_1$+(time to scan $P_1P_3P_4$)+Sleep$_2$, Sleep$_3$+(time to scan $P_1P_3P_4$)+Sleep$_4$, etc.

In another example, the profiles stored in the device may be partitioned into three groups: (1) profiles to which, previously, the device has connected 5 or more times while located in the cell; (2) profiles to which, previously, the device has connected at least once but fewer than 5 times while located in the cell; and (3) other profiles. The partition of the profiles into groups will depend on which cell the device is located in when performing the scanning. The device may scan once per each sleep interval for wireless local area networks matching profiles in the first group, once per each other sleep interval for wireless local area networks matching profiles in the second group, and once per each third sleep interval for wireless local area networks matching profiles in the third group.

To continue the example for the cell record for cell 116 given above, device 102 may scan for WLANs matching profile Pi after each sleep interval, for WLANs matching profiles $P_3$ and $P_4$ after every other sleep interval and for WLANs matching the profiles $P_2$ and $P_5$ after every third sleep interval:

$P_1P_2P_3P_4P_5$ Sleep$_1$ $P_1$ Sleep$_2$ $P_1P_3P_4$ Sleep$_3$ $P_1P_2P_5$ Sleep$_4$ $P_1P_3P_4$ Sleep$_5$ $P_1$ Sleep$_6$ $P_1P_2P_3P_4P_5$ Sleep$_7$ $P_1$ Sleep$_8$ . . . .

For profile $P_1$, the set of sleep interval durations is Sleep$_1$, Sleep$_2$, Sleep$_3$, Sleep$_4$, etc. For the group of profiles $P_3$ and $P_4$, the set of sleep interval durations is Sleep$_1$+(time to scan $P_1$)+Sleep$_2$, Sleep$_3$+(time to scan $P_1P_2P_5$)+Sleep$_4$, etc. For the group of profiles $P_2$ and $P_5$, the set of sleep interval durations is $Sleep_1$+(time to scan $P_1$)+$Sleep_2$+(time to scan $P_1P_3P_4$)+$Sleep_3$, $Sleep_4$+(time to scan $P_1P_3P_4$)+$Sleep_5$+(time to scan $P_1$)+$Sleep_6$, etc.

It is obvious to a person of ordinary skill in the art to generalize this partition into two or more groups, based on the presence of a profile in the cell record and the number of associations in the profile record.

Figure 6:
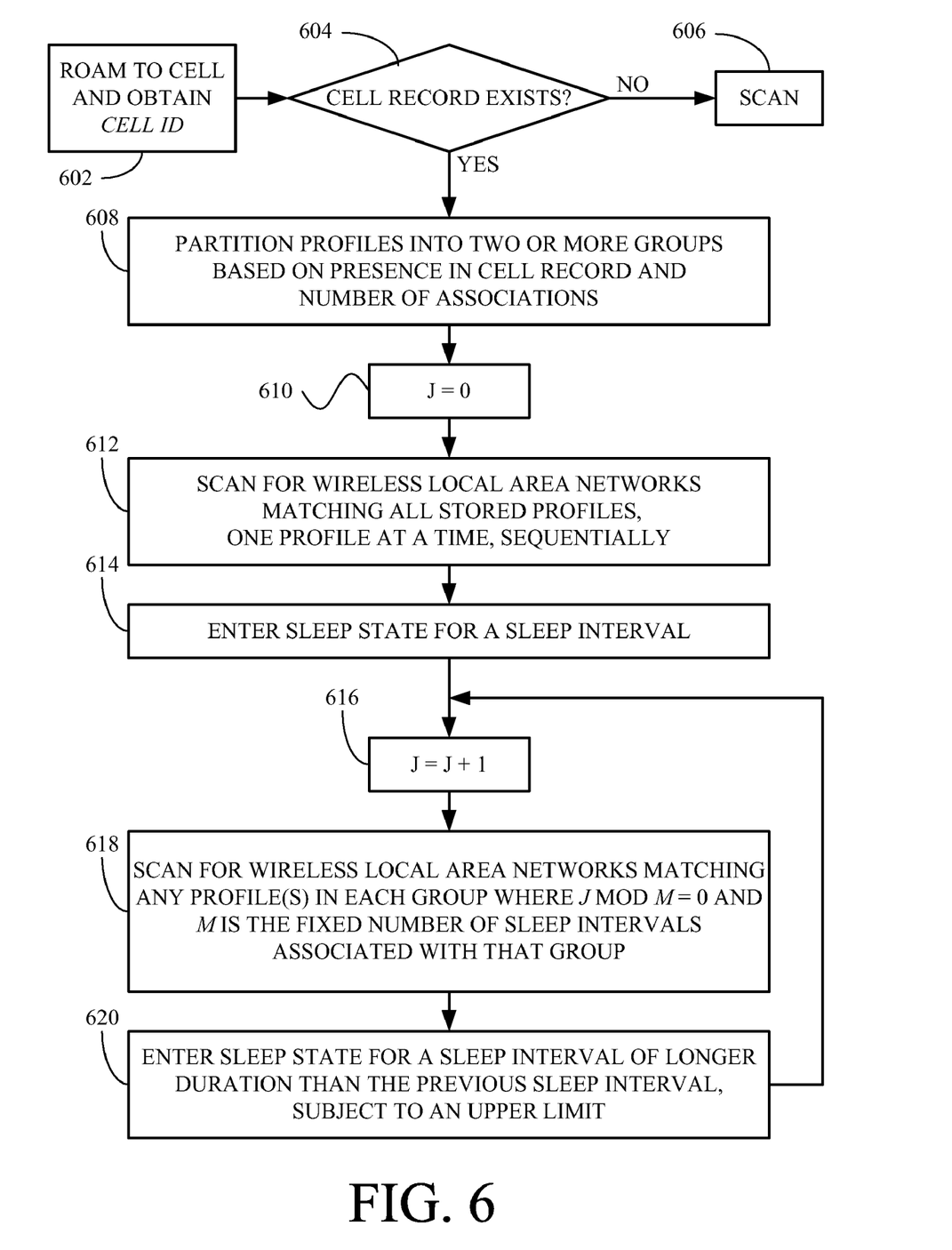
FIG. 6 is a flowchart of an exemplary scanning method for two or more groups of profiles.

FIG. 6 is a flowchart of an exemplary scanning method for two or more groups of profiles. At 602, device 102 roams to a particular cell and obtains the cell ID. If a cell record for this cell ID does not exist, as checked at 604, then scanning for WLANs is done at 606 according to any suitable method. Otherwise, the profiles stored in device 102 are partitioned at 608 into two or more groups based on whether a profile record for a profile is maintained in the cell record and the number of times the device was located in the cell and connected to a WLAN matching the profile identified in the profile record. A group may consist of one or more profiles. Each group has associated with it a fixed number M of sleep intervals.

At 610, a counter J is set to zero. At 612, device 102 scans for wireless local area networks matching the stored profiles. If a matching wireless local area network is found, then this method is exited during 612 so that device 102 can attempt to associate with the access point that controls the matching wireless local area network. Once scanning has been conducted once for each of the stored profiles, at 614, the WLAN radio and possibly other components of device 102 enter a sleep state for a sleep interval $Sleep_1$.

At 616, counter J is incremented by one. At 618, device 102 scans for wireless local area networks matching any profile(s) in each group for which J mod M=0, where M is the fixed number of sleep intervals associated with that group. If a matching wireless local area network is found, then this method is exited during 618 so that device 102 can attempt to associate with the access point that controls the matching wireless local area network. Otherwise, at 620, the WLAN radio and possibly other components of device 102 enter a sleep state for a sleep interval of longer duration than the previous sleep interval, subject to an upper limit. The method then resumes from incrementing counter J by one at 616.

An alternate implementation of scanning more frequently for WLANs matching profiles to which, previously, the device has connected while located in the cell, than for WLANs matching other profiles, will be described with respect to FIGS. 7 and 8, which are flowcharts of exemplary scanning methods for two and three groups of profiles, respectively.

At 702, device 102 roams to a particular cell and obtains the cell ID. If a cell record for this cell ID does not exist, as checked at 704, then scanning for WLANs is done at 706 according to any suitable method. Otherwise, the profiles stored in device 102 are partitioned at 708 into two groups based on whether a profile record for a profile is maintained in the cell record. A group may consist of one or more profiles. Each group has associated with it a set of sleep interval durations.

At 710, using the first set of sleep interval durations, device 102 scans for WLANs matching profiles in the first group i.e. those profiles for which a profile record is maintained for the cell identified at 702. At 712, using the second set of sleep interval durations, device 102 scans for WLANs matching profiles in the second group i.e. those profiles for which a profile record is not maintained for the cell identified at 702. Each sleep interval duration in the first set is shorter than its corresponding sleep interval duration in the second set. Care must be taken to ensure that the scanning of the first group and the scanning of the second group do not coincide in time. For example, a rule may be implemented that if scanning of the second group is to commence, according to its set of sleep interval durations, at a time when scanning of the first group is occurring, then the scanning of the second group is delayed until the scanning of the first group is finished.

Figure 7:
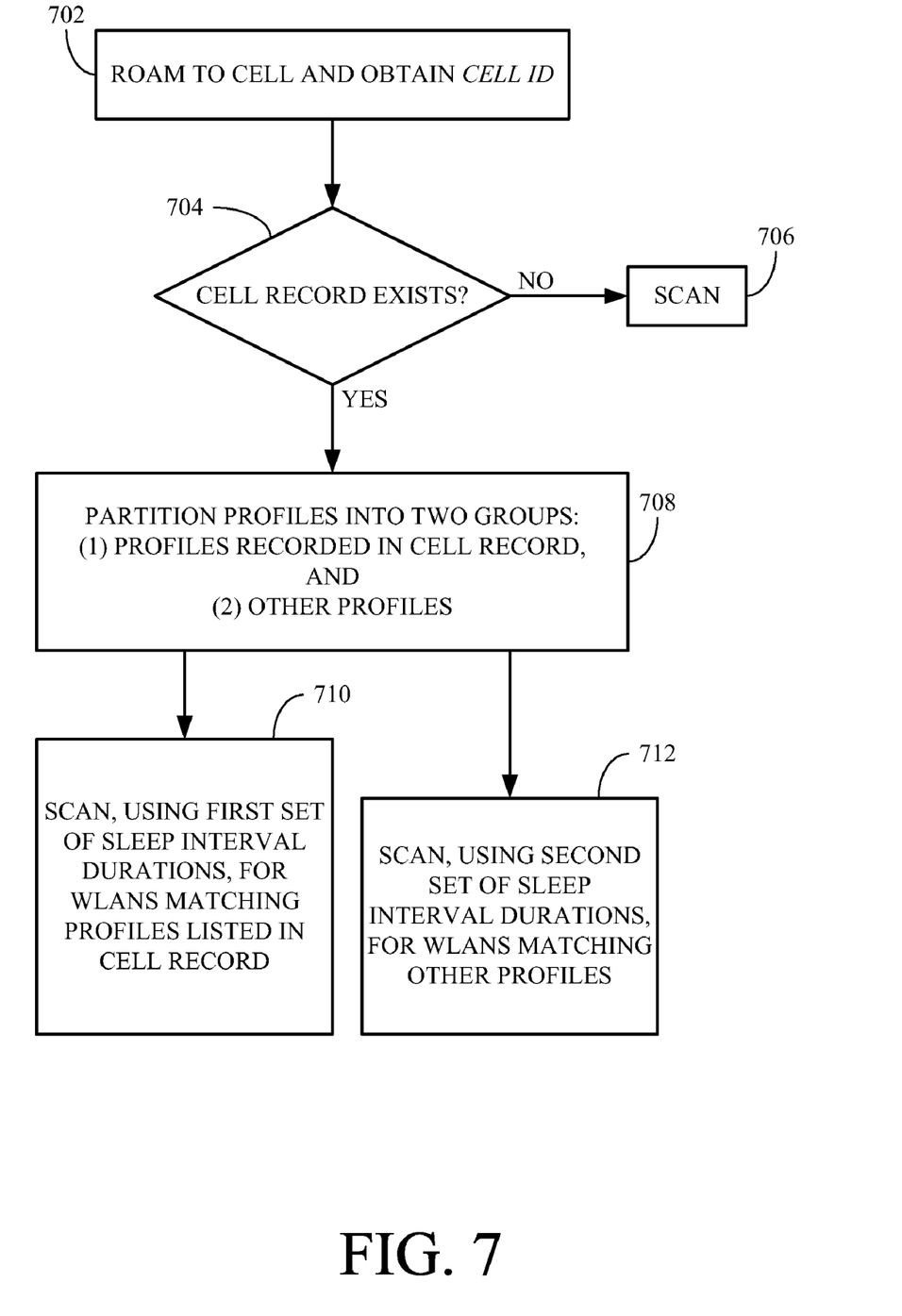
FIGS. 7 and 8 are flowcharts of exemplary scanning methods for two and three groups of profiles, respectively.
Figure 8:
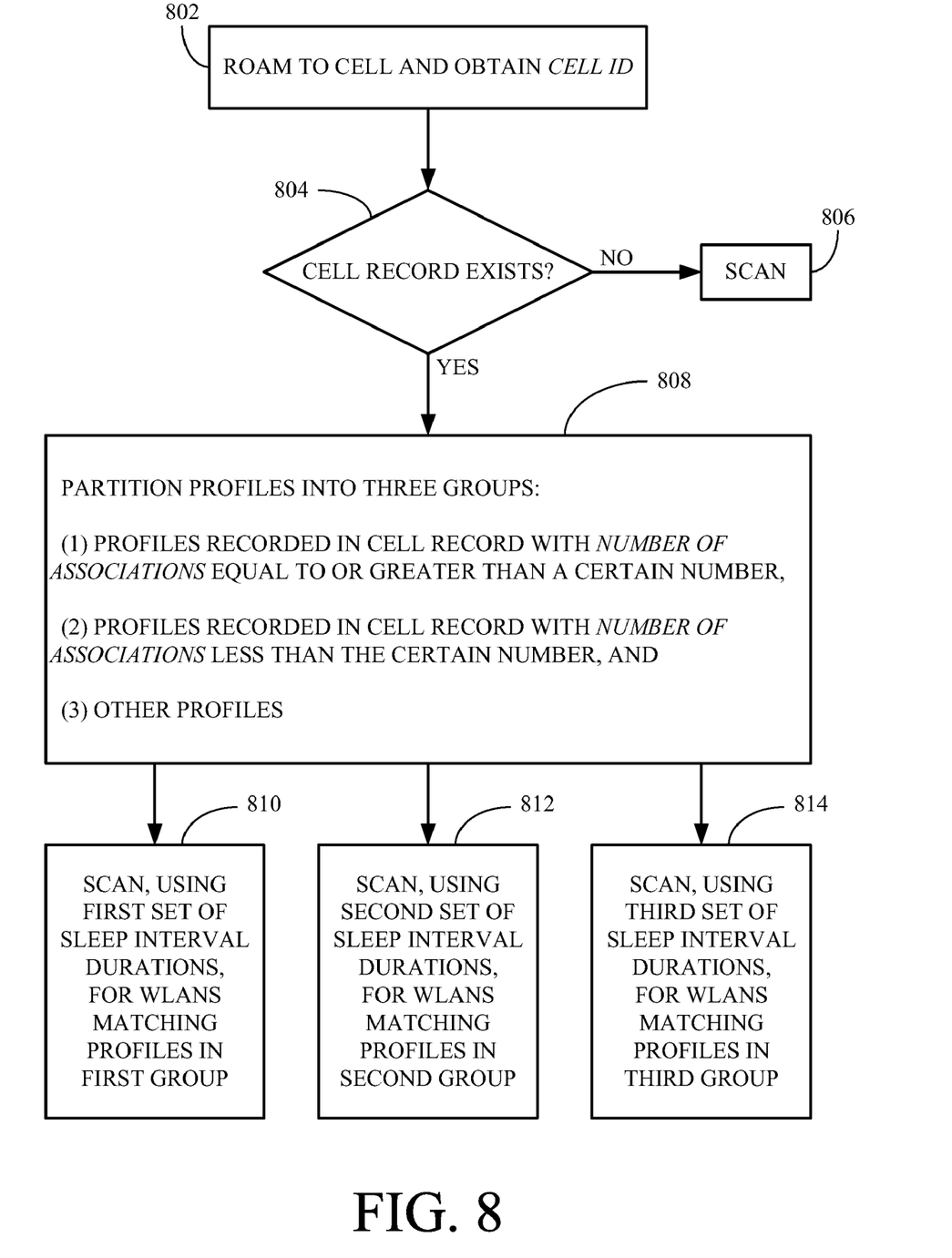

The method of FIG. 8 is similar to that of FIG. 7, except that the profiles are partitioned into three groups.

At 802, device 102 roams to a particular cell and obtains the cell ID. If a cell record for this cell ID does not exist, as checked at 804, then scanning for WLANs is done at 806 according to any suitable method. Otherwise, the profiles stored in device 102 are partitioned at 808 into three groups: (1) profiles recorded in the cell record with a number of associations equal to or greater than a certain number; (2) profiles recorded in the cell record with a number of associations less than the certain number; and (3) other profiles. A group may consist of one or more profiles. Each group has associated with it a set of sleep interval durations.

At 810, using the first set of sleep interval durations, device 102 scans for WLANs matching profiles in the first group. At 812, using the second set of sleep interval durations, device 102 scans for WLANs matching profiles in the second group. At 814, using the third set of sleep interval durations, device 102 scans for WLANs matching profiles in the third group. Each sleep interval duration in the first set is shorter than its corresponding sleep interval duration in the second set. Likewise, each sleep interval duration in the second set is shorter than its corresponding sleep interval duration in the third set.

As explained above with respect to FIG. 7, care must be taken to ensure that the scanning of the first group, the scanning of the second group and the scanning of the third group do not coincide in time. For example, a rule may be implemented that if scanning of the second group is to commence, according to its set of sleep interval durations, at a time when scanning of the first group is occurring, then the scanning of the second group is delayed until the scanning of the first group is finished.

It is obvious to persons of ordinary skill in the art how to modify the methods of FIGS. 7 and 8 to more than three groups.

For all of the scanning methods described hereinabove, scanning of profiles in a particular group may be done one profile at a time, sequentially, in order of descending priority of the profiles.

Figure 9:
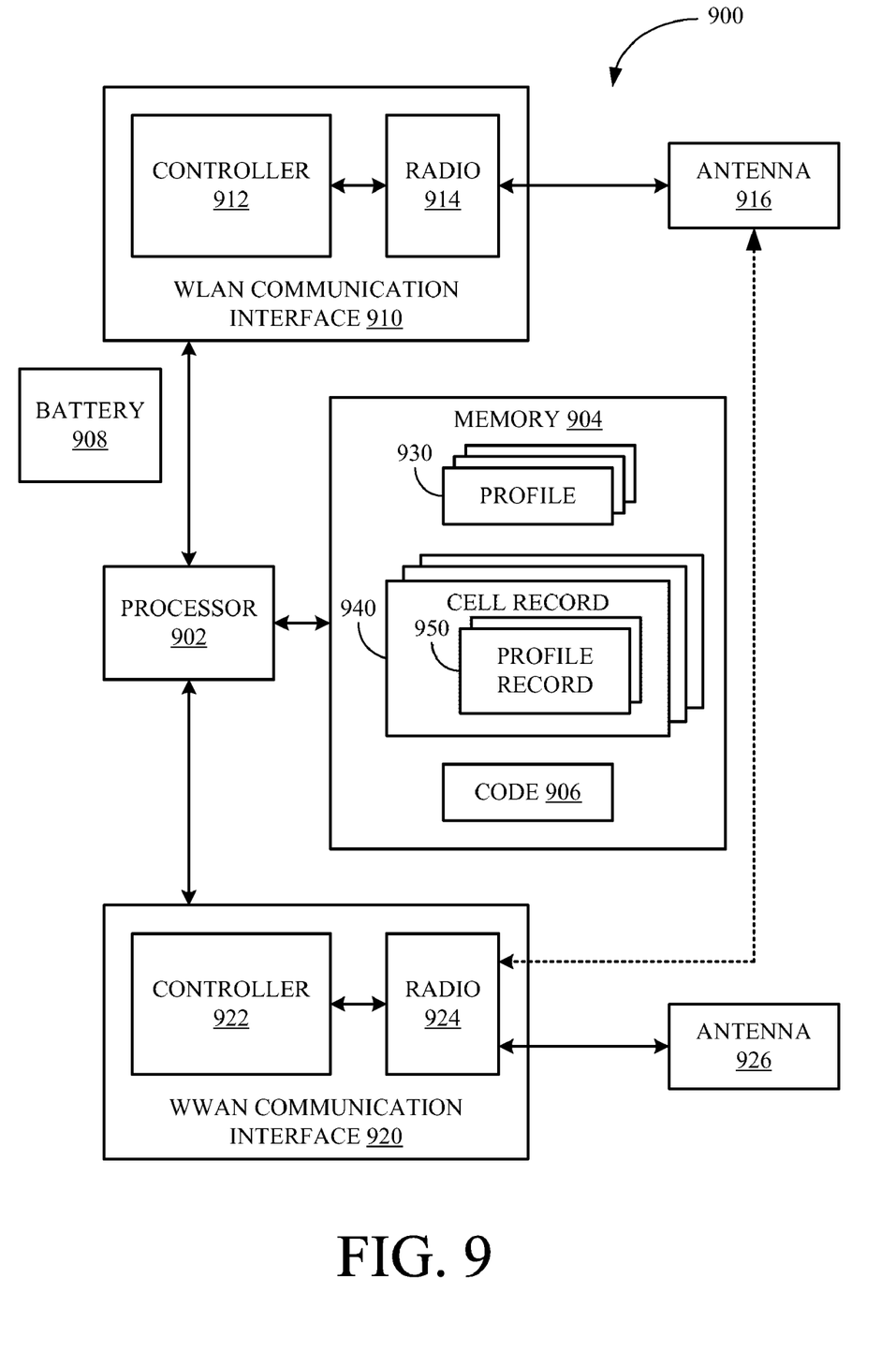
FIG. 9 is a block diagram of an exemplary client device.

FIG. 9 is a block diagram of an exemplary client device 900. Device 900 is an example of client device 102. Device 900 comprises a processor 902, and a memory 904 coupled to processor 902. Memory 904 stores code 906 that, when executed by processor 902, may implement the methods described hereinabove. Device 900 also comprises a battery 908.

Device 900 includes a WLAN communication interface 910, compatible, for example, with one or more standards of the family of IEEE 802.11 wireless communication standards, or with one or more HiperLAN standards. WLAN communication interface 910 is coupled to processor 902, and comprises at least a baseband controller 912, a radio 914, and an antenna 916.

Device 900 includes a WWAN communication interface 920, compatible with one or more wireless cellular communication standards. WWAN communication interface 920 is coupled to processor 902, and comprises at least a baseband controller 922, a radio 924, and an antenna 926. WWAN communication interface 920 may share antenna 916 with WLAN communication interface 910, in which case antenna 926 is not needed.

Memory 904 is able to store profiles 930 of WLANs. Memory 904 is also able to store cell records 940 and profile records 950. As described hereinabove with respect to FIG. 2, a cell record may comprise one or more cell-specific profile records.

A non-exhaustive list of examples for device 900 includes a laptop, a cellphone, a personal digital assistant (PDA), a smart phone, a video camera, a gaming console, an Internet Protocol (IP) phone, and any other suitable mobile client device.

While certain features have been illustrated and described herein, many modifications, substitutions, changes, and equivalents will now occur to those of ordinary skill in the art. For example, throughout this description and claims, a directed cell identified as such from signals of a base station of a cellular network may take the place of a cell. It is, therefore, to be understood that the appended claims are intended to cover all such modifications and changes.

What is claimed is:

1. A method for scanning for wireless local area networks, the method comprising:
   storing profiles of wireless local area networks in a device;
   identifying via a wireless wide area network interface of the device in which cell of a cellular network the device is currently located; and
   scanning via a wireless local area network (WLAN) interface of the device for wireless local area networks matching stored profiles to which, previously, the device has connected while located in the cell and for wireless local area networks matching other stored profiles, such that scanning for wireless local area networks matching stored profiles to which, previously, the device has connected while located in the cell occurs more frequently than scanning for wireless local area networks matching the other stored profiles.

2. The method of claim 1, wherein scanning more frequently comprises:
   scanning once per each sleep interval for wireless local area networks matching profiles to which, previously, the device has connected while located in the cell; and
   scanning once per each other sleep interval for wireless local area networks matching the other profiles.

3. The method of claim 1, further comprising:
   maintaining for the cell records on a per-profile basis of the number of times the device has connected to wireless local area networks matching profiles stored in the device while located in the cell.

4. The method of claim 3, further comprising:
   partitioning profiles stored in the device into two or more groups based on whether a record for a profile is maintained for the cell and the number of times the device was located in the cell and connected to a wireless local area network matching the profile identified in the record, each group having associated therewith a fixed number of sleep intervals,
   wherein scanning more frequently comprises scanning after a J-th sleep interval for wireless local area networks matching profiles in those particular groups where J mod M equals zero and M is the fixed number of sleep intervals associated with that particular group.

5. The method of claim 4, wherein scanning after a J-th sleep interval comprises:
   scanning profiles in those particular groups in order of increasing M and within each of those particular groups, by priority of the profile.

6. The method of claim 1, wherein scanning more frequently comprises:
   scanning according to a first set of one or more sleep interval durations for wireless local area networks matching profiles to which, previously, the device has connected while located in the cell; and
   scanning according to a second set of one or more sleep interval durations for wireless local area networks matching the other profiles,
   wherein each sleep interval duration in the first set is shorter than its corresponding sleep interval duration in the second set.

7. The method of claim 1, wherein scanning more frequently comprises:
   scanning according to a first set of one or more sleep interval durations for wireless local area networks matching profiles to which, previously, the device has connected at least a certain number of times while located in the cell; and
   scanning according to a second set of one or more sleep interval durations for wireless local area networks matching profiles to which, previously, the device has connected at least once and fewer than said certain number of times while located in the cell; and
   scanning according to a third set of one or more sleep interval durations for wireless local area networks matching the other profiles,
   wherein each sleep interval duration in the first set is shorter than its corresponding sleep interval duration in the second set, and wherein each sleep interval duration in the second set is shorter than its corresponding sleep interval duration in the third set.

8. A wireless device comprising:
   a processor;
   a wireless local area network (WLAN) interface coupled to the processor;
   a wireless wide area network interface coupled to the processor; and
   a memory coupled to the processor, the memory arranged to store profiles of wireless local area networks and arranged to store code which, when executed by the processor, identifies via the wireless wide area network interface of the device in which cell of a cellular network the device is currently located and causes the WLAN interface to scan via the wireless local area network interface of the device for wireless local area networks matching stored profiles to which, previously, the device has connected while located in the cell and for wireless local area networks matching other stored profiles, such that scanning for wireless local area networks matching stored profiles to which, previously, the device has connected while located in the cell occurs more frequently than scanning for wireless local area networks matching other stored profiles.

9. The wireless device of claim 8, wherein the code, when executed by the processor, causes the WLAN interface to scan once per sleep interval for wireless local area networks matching profiles to which, previously, the device has connected while in the cell, and causes the WLAN interface to scan once per each other sleep interval for wireless local area networks matching the other profiles.

10. The wireless device of claim 8, wherein the code, when executed by the processor, maintains for the cell records on a per-profile basis of the number of times the device has connected to wireless local area networks matching profiles stored in the device while located in the cell.

11. The wireless device of claim 10, wherein the code, when executed by the processor, partitions profiles stored in the device into two or more groups based on whether a record for a profile is maintained for the cell and the number of times the device was located in the cell and connected to a wireless local area network matching the profile identified in the record, each group having associated therewith a fixed number of sleep intervals, and scans after a J-th sleep interval for wireless local area networks matching profiles in those particular groups where J mod M equals zero and M is the fixed number of sleep intervals associated with that particular group.

12. A non-transitory computer readable medium storing instructions which, when executed by a processor of a wireless device having a wireless local area network (WLAN) interface and a wireless wide area network interface, result in the device identifying via the wireless wide area network interface of the device in which cell of a cellular network the device is currently located and causing the WLAN interface to scan via the wireless local area network interface of the device for wireless local area networks matching stored profiles to which, previously, the device has connected while located in the cell and for wireless local area networks matching other stored profiles, such that scanning for wireless local area networks matching stored profiles to which, previously, the device has connected while located in the cell occurs more frequently than scanning for wireless local area networks matching other stored profiles.

13. The non-transitory computer readable medium of claim 12 wherein the code, when executed by the processor, further results in scanning once per sleep interval for wireless local area networks matching profiles to which, previously, the device has connected while in the cell, and scanning once per each other sleep interval for wireless local area networks matching the other profiles.

14. The non-transitory computer readable medium of claim 12, wherein the code, when executed by the processor, further results in maintaining for the cell records on a per-profile basis of the number of times the device has connected to wireless local area networks matching profiles stored in the device while located in the cell.

15. The non-transitory computer readable medium of claim 14, wherein the code, when executed by the processor, further results in partitioning profiles stored in the device into two or more groups based on whether a record for a profile is maintained for the cell and the number of times the device was located in the cell and connected to a wireless local area network matching the profile identified in the record, each group having associated therewith a fixed number of sleep intervals, and scanning after a J-th sleep interval for wireless local area networks matching profiles in those particular groups where J mod M equals zero and M is the fixed number of sleep intervals associated with that particular group.

\* \* \* \* \*